Jan. 5, 1926.
G. E. BATES
1,568,495
DIRECTION INDICATOR FOR MOTOR VEHICLES
Filed July 7, 1922   3 Sheets-Sheet 1
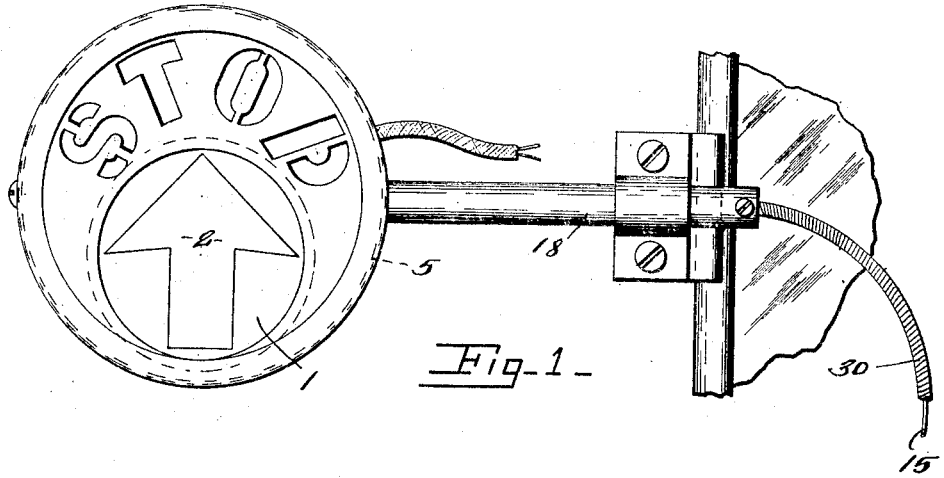
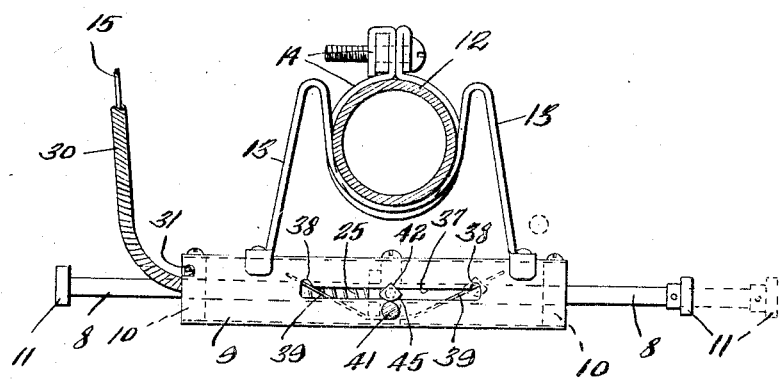
George E. Bates, INVENTOR.
BY Parsons & Bedell, ATTORNEYS.

Jan. 5, 1926. 1,568,495
G. E. BATES
DIRECTION INDICATOR FOR MOTOR VEHICLES
Filed July 7, 1922 3 Sheets-Sheet 2
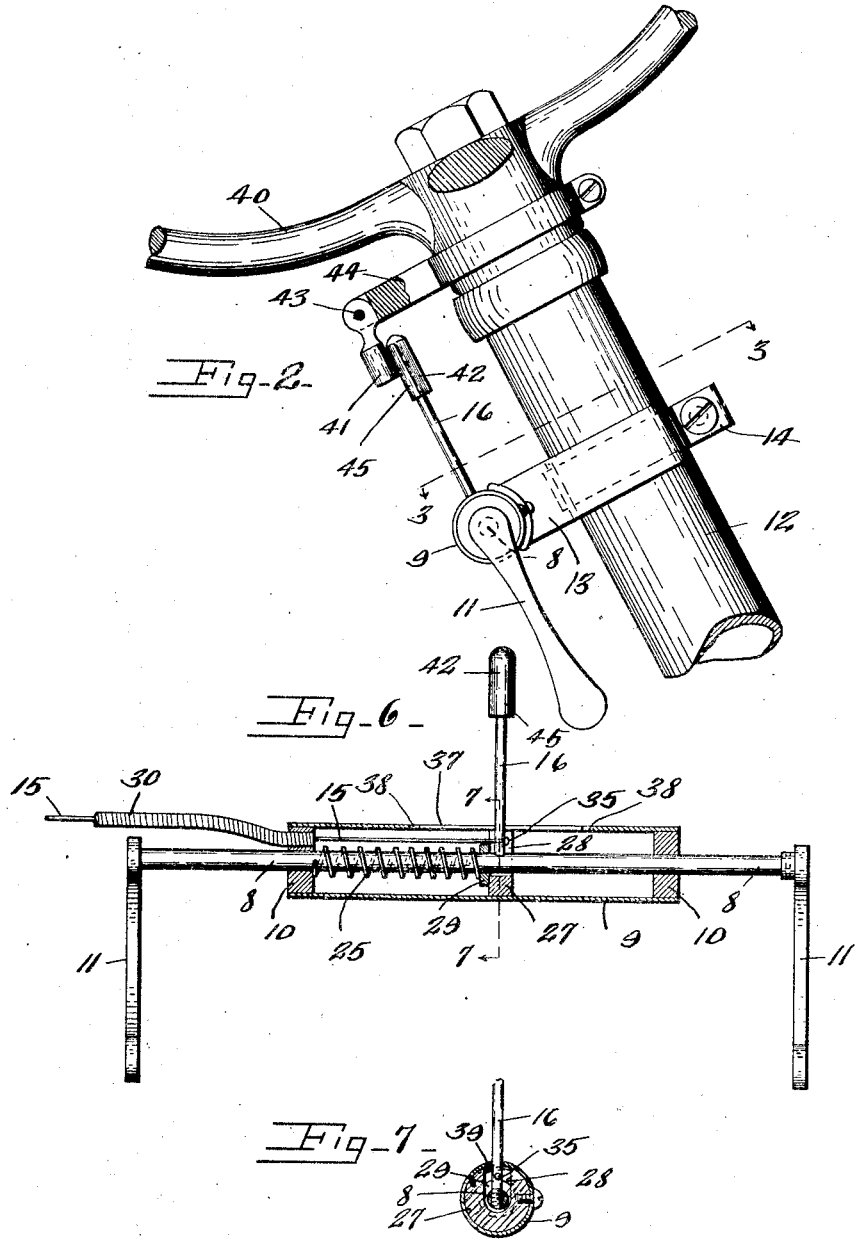
INVENTOR.
George E. Bates
BY
Parsons & Birdell
ATTORNEYS Jan. 5, 1926.  1,568,495
G. E. BATES
DIRECTION INDICATOR FOR MOTOR VEHICLES
Filed July 7, 1922  3 Sheets-Sheet 3
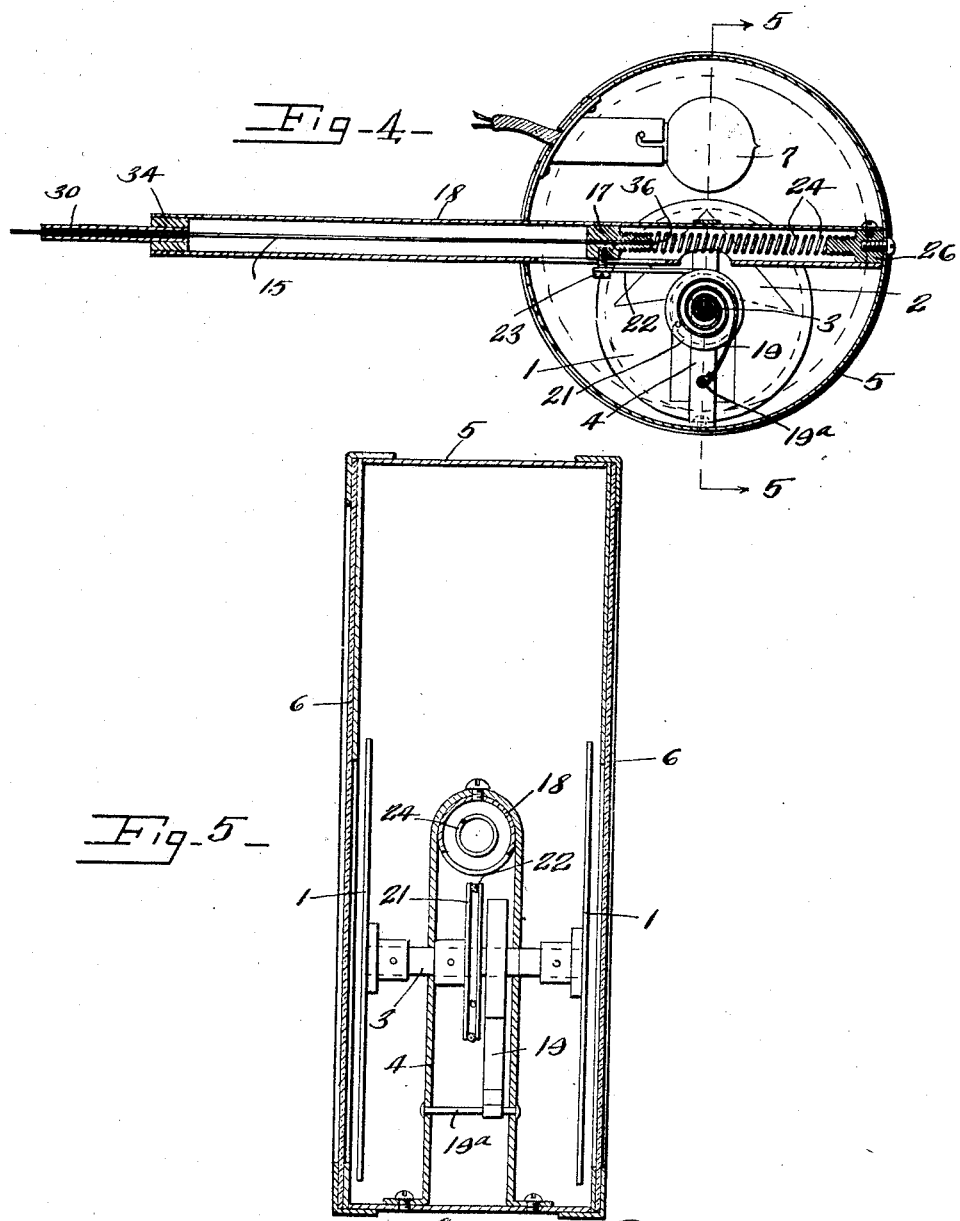

Patented Jan. 5, 1926.

1,568,495

UNITED STATES PATENT OFFICE.

GEORGE E. BATES, OF SYRACUSE, NEW YORK.

DIRECTION INDICATOR FOR MOTOR VEHICLES.

Application filed July 7, 1922. Serial No. 573,272.

*To all whom it may concern:*

Be it known that I, GEORGE E. BATES, a citizen of the United States, and a resident of Syracuse, in the county of Onondaga and State of New York, have invented a certain new and useful Direction Indicator for Motor Vehicles, of which the following is a specification.

This invention relates to traffic direction indicating signals for motor vehicles and has for its object, a particularly simple and efficient operating mechanism therefor by which the signal may be readily set, almost unconsciously, preliminary to the turning of the vehicle and reset automatically by the straightening up movement of the steering wheels of the vehicle.

The invention consists in the novel features and in the combinations and constructions hereinafter set forth and claimed.

In describing this invention, reference is had to the accompanying drawings, in which like characters designate corresponding parts in all the views.

Figure 1 is a rear elevation of a signal, the same being shown as attached to one of the windshield stanchions.

Figure 2 is an elevation, partly in section, of a portion of the operating means for the signal, the same being shown as mounted upon the steering column and steering or tiller wheel of the vehicle.

Figure 3 is a sectional view on line 3—3, Figure 2.

Figure 4 is a vertical longitudinal sectional view of the parts seen in Figure 1.

Figure 5 is a sectional view on line 5—5, Figure 4.

Figure 6 is a longitudinal sectional view taken substantially centrally of Figure 3.

Figure 7 is a sectional view on line 7—7, Figure 6.

This direction indicator comprises generally a signal and operating means therefor comprising a movable member connected to the signal, a prime mover movable to set the signal, means for transmitting the movement of the prime mover to the said movable member and means operated by the return or straightening movement of the steering gear of the motor vehicle toward central or normal position to reset the signal.

The invention also comprises operating means including a pull element as a wire and means by which movement of the prime mover in one direction causes the pulling force to be applied to one end of the pull wire and movement of the prime mover in the opposite direction causes the pulling force to be applied to the other end of the pull wire so that the force used to set the signal and to return it to its central or neutral position is always transmitted through the pull wire and no pushing or compression force is applied to the wire.

The signal here illustrated comprises indicator members 1 facing forwardly and rearwardly and having arrows 2 thereon, the members 1 being preferably disks forming a background for the arrows 2, although any other form of signal may be used. The signal or members 1 is normally arranged in neutral position and shiftable in opposite directions from neutral to a point to the right or the left.

The movable member for operating the signal is here illustrated as a shaft 3 on the opposite ends of which the disks 1 are mounted, this shaft being mounted in a suitable frame 4 located within a cylindrical casing 5 having openings in its front and rear sides through which the signals are visible. These openings may be covered by glass panes 6 so that the casing is entirely closed. The casing 5 is large enough to house an electric lamp 7 which is preferably arranged above the signals 1 and the front and rear walls of the casing are provided with the word "Stop" in transparent letters on an opaque background. The lighting of the lamp is controlled by the movement of the clutch pedal of the vehicle, but this feature forms no part of this invention.

The operating means for the signal 1 in addition to the movable member or shaft 3 comprises generally a prime mover in opposite directions from neutral position, and means for transmitting the movement of the prime mover to the shaft 3 comprising a pull element or wire and means controlled by the prime mover and connected to opposite ends of the pull wire to draw the same in one direction or the other in accordance with the direction of movement of the prime mover from neutral position.

8 designates the prime mover which is here illustrated as an endwisely movable rod extending through a casing as a barrel 9, the rod being guided in the heads 10 of the casing, and having heads 11 at its ends by which it may be moved in one direction or the other. It may, if desired, be provided with depending arms 11, Figures 2 and 6, arranged in position to be engaged by the knees of the driver, so that instead of being operated by hand, it may be operated by the driver pressing one or the other of his legs against one or the other of the arms 11.

The casing 9 of the prime mover, as here illustrated, is arranged near and mounted upon the steering column 12 of the vehicle, so that the prime mover 8 extends horizontally crosswise of the steering column, it being here shown as provided with a bracket 13 having a suitable clamp 14 embracing the column 12. The prime mover is operator-operated and for convenience herein is referred to as manually operated.

15 is the pull wire connected at one end to the prime mover 8 and at its other end to the signal, the connection to the prime mover being rigid with the prime mover, such connection being here illustrated as a radially extending shoulder 16 on the prime mover; and the connection with the signal including a slide 17 movable in a tubular guide 18 carried by the casing 5 and extending crosswise of and above the shaft 3, a spring 19 coiled about the shaft 3 and fixed at one end thereto and anchored at its other end to a fixed point, as at 19ª to a frame 4 in which the shaft 3 is journalled, a pulley 21 fixed to the shaft and a strap or cable 22 fixed at one end at 23 to the slide 17 and winding on the pulley. The spring 19 is tensioned to turn the shaft in one direction.

The means controlled by the prime mover and connected to opposite ends of the pull member or wire 15 to draw the same in one direction or the other in accordance with the direction of movement of the prime mover from neutral position and to return the signal and the prime mover to neutral position, comprises a spring 24 connected to one end of the pull wire 15 or to the slide 17 and tending to move the pull wire in the same direction as the spring 19, a spring 25 here shown as a compression spring of greater strength than the springs 24 and 19, and here illustrated as acting directly on the prime mover 8 and located in the casing 9. The spring 24 is here shown as a tension spring located within the tube 18 and connected at one end to the slide 17 and at its other end to a plug or abutment 26 in the tubular guide 18, and stop means for relieving the rod 8 of the spring 25 when the rod 8 or prime mover is in neutral position, the spring 25 acting in opposition to the springs 24 and 19. The spring 25 thrusts at one end against one of the heads 10 of the casing 9 and at its other end against the rod 8.

The stop means, as here shown, comprises a partition 27 fixed in the casing 9 about midway between the ends thereof and having a transverse passage 28 in which the shoulder 16 is normally arranged. Usually a washer 29 is interposed between the inner end of the spring 25 and the partition 27 and this washer is arranged in the path of the shoulder 16 when the prime mover is moved in one direction as to the left, Figure 6.

The pull wire 15 extends from the shoulder 16 through one of the heads 10 of the casing 9 and endwisely through the tube 18 to the slide 17, and the portion thereof between the casing 9 and the tube 18 is encased in a suitable casing 30. One end of this casing is attached in position in the head 10 of the casing 9 by a suitable set screw 31, Figure 3, and the end of the casing adjacent the tube 18 is held in a suitable plug 34 in the outer end of the tubular guide 18. The pull wire is connected to the shoulder 16 and to the slide 17, by swivel joints which permit the wire to turn without binding during the operation of the wire. The wire, as illustrated, extends through the shoulder 16 and through the slide 17 and is provided with rounding heads 35 and 36 at its opposite ends. By reason of these swivel joints, or heads 35, 36, the wire is given such a freedom of movement so that the only strain thereon is the pulling or tension.

In the operation, as thus far described, upon movement of the prime mover to the right, Figures 3 and 6, the wire 15 is pulled to the right in Figure 6 and to the left in Figure 4, as Figure 4 is a view taken from the front side of the signal. The pulling of the wire pulls the slide 17 to the left, Figure 4, additionally tensions the spring 24, and also pulls on the strap or cable 22 causing the shaft 3 to be rotated to the left, Figure 4, or to the right, Figure 1, and the signal 1 to indicate that the right hand turn is to be taken.

When the prime mover reaches its extreme right hand position, Figures 3 and 6, it is held in such position by means to be presently described. Upon the release of the prime mover from its shifted position, as will be hereinafter described, the spring 24 retracts and permits the shaft 3 and signals to return to their normal or neutral position, the spring 19 turning the shaft.

When the prime mover 8 is moved to the left, Figures 3 and 6, the shoulder 16 thrusting against the washer 29 compresses the stronger spring 25 and while the pressure is being applied to the prime mover 8 the spring 24 pulls the wire 15 to the right, Figure 4, thus relieving the pull on the strap or cable 22 of the pulley 21 and permitting the spring 19 to turn the shaft 3 and hence the signals 1 to the right, Figure 4, or left, Figure 1. When the prime mover 8 is shifted to the limit of its movement to the left, it is held in shifted position as will be presently described.

The means for holding the prime mover in its shifted positions comprises a latch movable with the prime mover and a keeper on the casing 9, and means for rocking or moving the prime mover 8 about its axis slightly to shift the shoulder 16 into such notches. In the illustrated embodiment of my invention, the latch is an extension of the shoulder 16; and as seen in Figure 6, the casing 9 is provided with a lengthwise slot 37 through which the shoulder 16 extends and with notches 38 at the ends of the slot. The means provided for rocking the rod 8 to shift the shoulder 16 into one or the other of the notches 38 comprises spring arms 39 located within the casing 9 and arranged to thrust against the shoulder 16 as the shoulder approaches one or the other of the notches 38 so that when the shoulder registers with one or the other of such notches the spring thrusts the shoulder into the notch.

The prime mover may be released by hand from the notches 38, but preferably is released from such holding means automatically by means operated by the steering gear of the vehicle when the steering or tiller wheel is being returned to its normal or straight position, that is, the position thereof when the front or steering wheels are set to guide the vehicle in a straight course, although obviously, the prime mover may be relieved by merely pressing the shoulder 16 out of the notch 38 with which it is engaged so that it will be moved to its neutral position by the spring 24 when the prime mover is shifted to the right in Figure 6, or by the spring 25 when it is shifted to the left in Figure 6.

The steering or tiller wheel is the most convenient and accessible part of the steering gear to coact with a prime mover located within reach of the driver of the vehicle and hence releasing means is mounted on or connected to the tiller wheel to rotate therewith.

40 designates the tiller wheel and the means for releasing the prime mover from the holding means, that is, from the notches 38 and comprises a trip shoulder 41 rotatable with the steering wheel, and fixed shoulder 42 movable with the prime mover 8 and movable into the path of movement of the trip shoulder 41 when the prime mover is in either of its right or left shifted positions with the shoulder 16 in one or the other of the notches 38, one of these shoulders being arranged to ratchet past the other when the tiller wheel is being turned from straight or normal position and to positively engage or abut against and move the other shoulder and hence cause the release of the prime mover when the tiller wheel is being returned from an angular position to straight or central position.

In the illustrated embodiment of my invention the shoulder 42 is carried by the extension on the shoulder 16 and the shoulder 41 is pivoted in a transverse horizontal pivot 43 to a suitable support or bracket 44 secured in any suitable manner to the tiller wheel 40 to rotate therewith.

When the prime mover is in central position the shoulder 42 is out of the path or orbit of the trip shoulder 41 and when the prime mover is shifted into either of its extreme positions with the shoulder 16 in either of the notches 38 the shoulder 42 is in the orbit or path of the trip shoulder 41. Upon turning of the tiller wheel from straight position, the trip shoulder 41 will engage the shoulder 42 but ratchet it by swinging on its pivot 43 due to the engagement of inclined surfaces 45 on one or the other of these shoulders 41 and 42. When, however, the tiller wheel is moved backwardly toward straight position the shoulder 41 which has swung back by its weight to its normal position, Figure 2, after it passed the shoulder 42 now abuts squarely against the shoulder 42 and moves the same rearwardly causing it, or the portion 16 thereof, to move out of the notch 38 so that the spring 24 or 26, as the case may be, is free to move the prime mover and hence permit the signal to move to central or neutral position.

Thus when approaching a corner which the driver desires to turn, the driver almost unconsciously actuates the prime mover either by hand or with his knee and this movement causes the signal to be set. After the corner is turned and the driver straightens the vehicle by turning the steering or tiller wheel, the turning movement of the steering or tiller wheel, to its straight or normal position, trips the shoulder 16 out of one or the other of the notches 38, permitting the prime mover and the signal to be returned to its neutral position by either spring 24 or 25 as the case may be.

Owing to the signal operating mechanism, the signal can be set almost unconsciously before the corner is reached and automatically resets itself after the corner is turned.

Owing to the arrangement of the operating mechanism a pull wire can be used and as the strain is always a pulling strain, the wire does not buckle, bind or deteriorate, and owing to the swiveling of the wire at its ends it is free to turn while the pulling force is being applied thereto and hence will not twist up and break.

What I claim is:

1. In a direction indicator for motor vehicles, the combination of a signal, movable from neutral position in opposite directions, and operating mechanism therefor, comprising a movable member connected to the signal, a prime mover movable in opposite directions from neutral position, and means for transmitting the movement of the prime mover of said member, comprising a pull element and means controlled by the prime mover, and connected to opposite ends of the pull element to pull the same in one direction or the other in accordance with the direction or movement of the prime mover from neutral position.

2. In a direction indicator for motor vehicles the combination of a signal movable in opposite directions from neutral, an operating mechanism therefor comprising a movable member connected to the signal, a prime mover movable in opposite directions from neutral position, and means for transmitting the movement of the prime mover to said member comprising a pull element, a spring connected to one end of said element and tending to draw it in one direction, a connection between the prime mover and the other end of the pull element, whereby movement of the prime mover in one direction from neutral permits the spring to draw the pull element in one direction and movement of the prime mover in the opposite direction from neutral draws the pull element in the opposite direction, substantially as and for the purpose specified.

3. In a direction indicator for motor vehicles, the combination of a signal movable in opposite directions from neutral, and operating mechanism therefor comprising a movable member connected to the signal, a prime mover movable in opposite directions from neutral position, and means for transmitting the movement of the prime mover to said member comprising a pull element and means controlled by the prime mover and connected to opposite ends of the pull element to draw the same in one direction or the other in accordance with the direction of movement of the prime mover from neutral position, substantially as and for the purpose set forth.

4. In a direction indicator for motor vehicles, the combination of a signal movable in opposite directions from neutral, and operating mechanism therefor comprising a movable member connected to the signal, a prime mover movable in opposite directions from neutral position, means for transmitting the movement of the prime mover to said member comprising a pull element and means controlled by the prime mover and connected to opposite ends of the pull element to draw the same in one direction or the other in accordance with the direction of movement of the prime mover from neutral position, and means for holding the prime mover in either of its shifted positions, substantially as and for the purpose described.

5. The combination with the steering gear of a motor vehicle; of a direction indicator for motor vehicles, comprising a signal, and operating means therefor, comprising a movable member connected to the signal, a prime mover arranged to be operated in opposite directions from neutral position to set the signal, means for holding the signal in said position and means operated by the movement of the steering gear of the vehicle to release the holding means when the steering gear is operated to set the steering wheels in a straight line; in combination with the steering gear of a motor vehicle, substantially as and for the purpose set forth.

6. The combination with a steering gear of a motor vehicle, of a direction indicator comprising a signal, and operating means therefor, including a movable member, a manually movable prime mover operating to set the signal and means operated by the steering gear to reset the signal when the steering gear is operated to move the steering wheels of the vehicle toward a straight line, substantially as and for the purpose specified.

7. In combination with a steering gear of a motor vehicle, of a direction indicator comprising a signal, and operating means therefor, including a movable member, a manually movable prime mover operating to set the signal, and means operated by the steering gear to reset the signal when the steering gear is operated to reset the steering wheels of the vehicle so that it travels in a straight line, said resetting means comprising a shoulder associated with the steering gear, a shoulder associated with the operating mechanism and shiftable during the setting of the signal in the path of the other shoulder, one of said shoulders being arranged to ratchet past the other during the setting operation of the prime mover, substantially as and for the purpose set forth.

8. The combination of a motor vehicle having a tiller wheel, of a direction indicator comprising a signal, and operating means therefor including a movable member, a prime mover fixed relatively to the tiller wheel and movable in opposite directions from neutral position, means tending to move the prime mover to neutral position and means for holding it in either of its shifted positions, a trip shoulder carried by and rotatable with the tiller wheel, the holding means including a shoulder movable into the path of the trip when the prime mover is shifted from neutral in either of its shifted positions and arranged to ratchet past the former shoulder of the holding means during turning of the tiller wheel from its straight or normal position into an angular position and to positively engage and shift the shoulder of the holding means when the prime mover is in either of its shifted positions and hence release the prime mover during movement of the tiller wheel from angular position toward straight position, substantially as and for the purpose described.

9. The combination with a steering column and tiller wheel of a motor vehicle, of a direction indicator comprising a signal, and operating mechanism therefor, comprising a prime mover mounted on the steering column and movable in opposite directions from neutral position, means for returning the prime mover to neutral position and means for holding it in either of its shifted positions, comprising a shoulder on the prime mover, and a trip shoulder carried by the tiller wheel and rotatable therewith, the former shoulder being movable into the path of the trip shoulder when the prime mover is in either of its shifted positions and the trip shoulder being arranged to ratchet past the former shoulder during movement of the tiller wheel from its normal or straight position into an angular position and to positively engage the former shoulder to trip the same during movement of the tiller wheel, from angular position toward its normal position, substantially as and for the purpose specified.

10. The combination with the tiller wheel and column of a motor vehicle, a direction indicator comprising a signal and operating means therefor including a prime mover mounted on the steering column and movable crosswise thereof in opposite directions from neutral position to set the signal, the prime mover being formed with a shoulder, a trip shoulder carried by the tiller wheel, said shoulder being movable into the path of the trip shoulder when the prime mover is moved to the right or the left into either of its shifted positions and one of the shoulders being arranged to ratchet past the other when the prime mover is in either of its shifted positions during movement of the tiller wheel from its normal position, and to positively engage and trip the shoulder on the prime mover to permit the prime mover to move to its neutral position during movement of the tiller wheel toward its normal position, substantially as and for the purpose set forth.

11. In combination with a steering gear for a motor vehicle and of a direction indicator comprising a signal, manually movable means operable to set the signal, means for returning the former means and the signal to starting position, means for holding the signal in its set position, and means associated with the steering gear to release the holding means when the steering gear is operated to return the steering wheels of the vehicle toward normal or straight position, substantially as and for the purpose described.

12. The combination with a steering gear of a motor vehicle, of a direction indicator comprising a signal, manually operable means operable to set the signal, spring means for returning the signal to starting position, means for holding the spring means from operating, and means operated by the movement of the steering gear toward its normal or straight position to release the holding means, substantially as and for the purpose specified.

13. The combination with a tiller wheel and column of a motor vehicle, of a direction indicator comprising a signal, means for setting the signal comprising a manually operable prime mover carried adjacent the steering column and movable crosswise thereof, means for returning the prime mover and signal to its starting position, holding means associated with the prime mover to lock the prime mover in set position, said releasing means carried by the tiller wheel and arranged to coact with the holding means during retrograde movement of the tiller wheel to reset the steering wheels of the vehicle in straight position, substantially as and for the purpose set forth.

14. The combination with a tiller wheel and column of a motor vehicle, of a direction indicator comprising a signal, means for setting the signal comprising a manually operable prime mover carried adjacent the steering column and movable crosswise thereof, means for returning the prime mover and signal to its starting position, holding means associated with the prime mover to lock the prime mover in set position, said releasing means carried by the tiller wheel and arranged to coact with the holding means during retrograde movement of the tiller wheel to reset the steering wheels of the vehicle in straight position, the holding means being normally out of the path of the releasing means, and movable into the path thereof by the setting movement of the prime mover, substantially as and for the purpose described.

In testimony whereof, I have hereunto signed my name, at Syracuse, in the county of Onondaga, and State of New York, this 1st day of July, 1922.

GEORGE E. BATES.